(12) United States Patent
Masago et al.

(10) Patent No.: US 10,585,113 B2
(45) Date of Patent: Mar. 10, 2020

(54) METHOD FOR DETERMINING DETACHMENT OF ACCELERATION SENSOR AND APPARATUS FOR DETERMINING DETACHMENT OF ACCELERATION SENSOR

(71) Applicant: BRIDGESTONE CORPORATION, Tokyo (JP)

(72) Inventors: Takeshi Masago, Tokyo (JP); Kazuo Hayashi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 16/301,212

(22) PCT Filed: Jun. 26, 2017

(86) PCT No.: PCT/JP2017/023357
§ 371 (c)(1),
(2) Date: Nov. 13, 2018

(87) PCT Pub. No.: WO2018/003734
PCT Pub. Date: Jan. 4, 2018

(65) Prior Publication Data
US 2019/0212360 A1 Jul. 11, 2019

(30) Foreign Application Priority Data
Jun. 30, 2016 (JP) .................................. 2016-131055

(51) Int. Cl.
*G01P 21/00* (2006.01)
*B60C 23/04* (2006.01)
(Continued)

(52) U.S. Cl.
CPC .......... *G01P 21/00* (2013.01); *B60C 23/0488* (2013.01); *G01P 15/0802* (2013.01); *B60C 19/00* (2013.01)

(58) Field of Classification Search
CPC .. G01P 21/00; G01P 15/0802; B60C 23/0488; B60C 19/00
(Continued)

(56) References Cited

U.S. PATENT DOCUMENTS

2004/0233050 A1* 11/2004 Burghardt ........... B60C 23/0416
340/445
2004/0261510 A1* 12/2004 Schulze .............. B60C 23/0408
73/146
(Continued)

FOREIGN PATENT DOCUMENTS

JP 2004-299536 A 10/2004
JP 2005-182570 A 7/2005
(Continued)

OTHER PUBLICATIONS

International Search Report of PCT/JP2017/023357 dated Sep. 19, 2017 [PCT/ISA/210].
(Continued)

*Primary Examiner* — Marrit Eyassu
(74) *Attorney, Agent, or Firm* — Sughrue Mion, PLLC (57) ABSTRACT

A method and an apparatus configured to acquire, as acceleration information, a peak level $a_k$ which is a magnitude of a peak on a positive side or a negative side of an acceleration signal in a tire circumferential direction or a tire width direction detected by an acceleration sensor, or a peak interval $b_k$ which is a time interval between peaks, or acquire the peak level $a_k$ or the peak interval $b_k$ of a differential acceleration signal in a tire radial direction obtained by differentiating the acceleration signal in the tire radial direction
(Continued)

tion; calculate ratios $P_k$, $Q_k$ of a difference between the acquired acceleration information $a_k$, $b_k$ and average values $A_{k-1}$ of the acceleration information to the average values; and determine that the acceleration sensor is detached from the inside of the tire when the calculated ratio $P_k$, $Q_k$ exceeds a preset threshold value $K_p$, $K_q$ by multiple times successively.

6 Claims, 3 Drawing Sheets

(51) Int. Cl.
    *G01P 15/08*     (2006.01)
    *B60C 19/00*     (2006.01)

(58) Field of Classification Search
    USPC .......................................................... 73/1.38
    See application file for complete search history.

(56) References Cited

U.S. PATENT DOCUMENTS

| | | | |
|---|---|---|---|
| 2006/0028326 A1* | 2/2006 | Haas | B60C 23/0408 340/426.33 |
| 2006/0041396 A1 | 2/2006 | Polzin | |
| 2006/0130570 A1 | 6/2006 | Anders et al. | |
| 2006/0196257 A1 | 9/2006 | Shimura | |
| 2007/0040660 A1* | 2/2007 | Miller | B60C 23/0408 340/442 |
| 2012/0173073 A1* | 7/2012 | Hanna | B60C 23/0488 701/29.4 |
| 2013/0116972 A1 | 5/2013 | Hanatsuka et al. | |
| 2014/0007683 A1 | 1/2014 | Guinart et al. | |

FOREIGN PATENT DOCUMENTS

| | | |
|---|---|---|
| JP | 2005-521579 A | 7/2005 |
| JP | 2011-199604 A | 10/2011 |
| JP | 2011-203017 A | 10/2011 |
| JP | 2011-242303 A | 12/2011 |
| JP | 2013-197977 A | 9/2013 |
| WO | 01/68416 A1 | 9/2001 |

OTHER PUBLICATIONS

International Preliminary Report on Patentability with English Translation of the Written Opinion of PCT/JP2017/023357 dated Jan. 10, 2019.

Communication dated Apr. 3, 2019, from the European Patent Office in counterpart European Application No. 17820089.5.

* cited by examiner

METHOD FOR DETERMINING DETACHMENT OF ACCELERATION SENSOR AND APPARATUS FOR DETERMINING DETACHMENT OF ACCELERATION SENSOR

CROSS REFERENCE TO RELATED APPLICATIONS

This application is a National Stage of International Application No. PCT/JP2017/023357, filed Jun. 26, 2017, claiming priority based on Japanese Patent Application No. 2016-131055, filed Jun. 30, 2016.

TECHNICAL FIELD

The present invention relates to a method for determining whether or not an acceleration sensor attached to inside of a tire is detached from the inside of the tire and an apparatus therefor.

BACKGROUND

Conventionally, there has been proposed a method in which information on acceleration acting on a tire is acquired by an acceleration sensor attached to inside of the tire and, from the acquired acceleration information, a condition of a road surface on which the tire is running and uneven wear of the tire are estimated.

As the above-mentioned acceleration information, for example, an acceleration waveform in a tire circumferential direction, an acceleration waveform in a tire width direction or an acceleration waveform in a tire radial direction, which acts on a tread of the running tire, is used (see PTL 1, for example).

CITATION LIST

Patent Literature

PTL 1: Japanese Unexamined Patent Application Publication No. 2011-242303

SUMMARY OF THE INVENTION

Technical Problem

There may be a case where the acceleration sensor is detached from the inside of the tire as adhesion between the acceleration sensor and the tire peels off because of distortions occurring repeatedly in the inside of the tire during running.

Figure 3A:
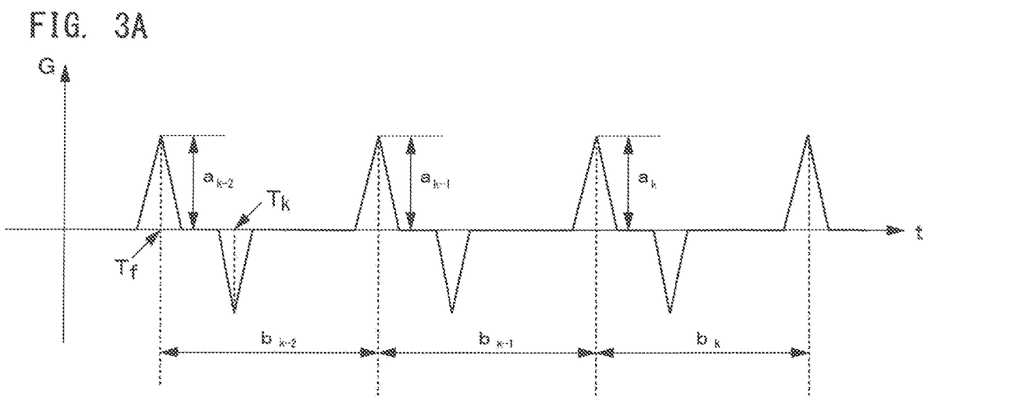
FIG. 3A is a diagram illustrating an example of an acceleration waveform in a tire radial direction at a normal time.
Figure 3B:
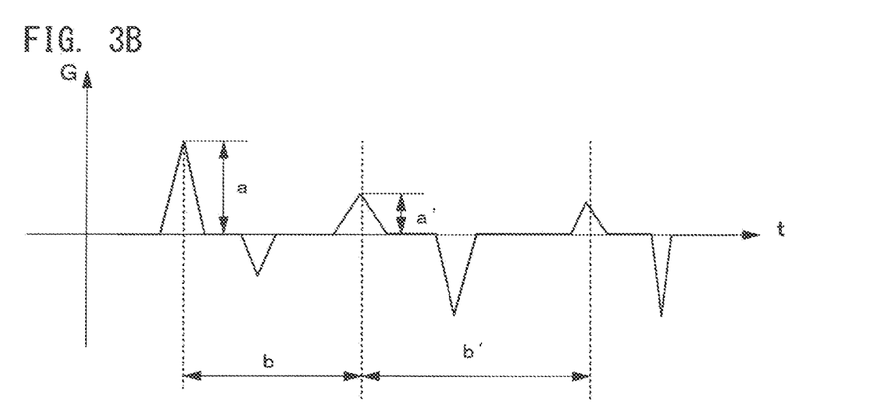
FIG. 3B is a diagram illustrating an example of an acceleration waveform in the tire radial direction at a detachment time.

In the output of the acceleration sensor, generally, a magnitude of a peak (hereinafter referred to as "peak level") $a_k$ appearing at a step-in point $T_f$ and a magnitude of a peak at a kick-out point $T_k$, and a time interval $b_k$ between the step-in points $T_f$ and a time interval between the kick-out points $T_k$ (hereinafter referred to as "peak interval") become constant, as illustrated in FIG. 3A. The peak interval corresponds to a time required for a tire to rotate one rotation in the normal time (a case where the acceleration sensor is not detached from the inside of the tire). In contrast, there has been a problem that, in a case where the acceleration sensor is detached from the inside of the tire, accurate estimation of a road surface condition cannot be achieved from these information because the peak level or the peak interval becomes uneven in the output of the acceleration sensor, as illustrated in FIG. 3B.

The present invention has been made in view of the conventional problem, and aims at providing a method and an apparatus for easily determining whether or not the acceleration sensor is detached from the inside of the tire.

Solution to Problem

The inventors have found, as a result of earnest investigation, that an acceleration sensor issues an output signal as the acceleration sensor contacts with the inside of the tire even if the acceleration sensor is detached from the inside of the tire, and that, by using the output signal, it is possible to determine detachment of the acceleration sensor from the inside of the tire. Thus, the inventors have made the present invention.

One aspect of the present invention relates to a method for determining whether or not an acceleration sensor is detached from inside of a tire based on acceleration information acquired from the acceleration sensor, the method including the steps of: acquiring, as the acceleration information, a peak level which is a magnitude of a peak on a positive side or a negative side of an acceleration signal in a tire circumferential direction or a in a tire width direction or a peak interval which is a time interval between peaks, or a peak level or a peak interval of a differential acceleration signal in a tire width direction obtained by differentiating an acceleration signal in the tire width direction; calculating a ratio of a difference between the acquired acceleration information and an average value of the acceleration information to the average value; and determining whether or not the acceleration sensor is detached from the inside of the tire based on the ratio, in which the average value of the acceleration information is an average value of at least three of acceleration information immediately before the acquired acceleration information, and in the step of determining whether or not the acceleration sensor is detached from the inside of the tire, the determination of detachment of the acceleration sensor from the inside of the tire is made when the ratio exceeds a preset threshold value by plural number of times successively.

In this way, since unevenness of the peak level of the detected acceleration waveform or the peak interval can be grasped accurately, it is possible to determine accurately whether or not the acceleration sensor is detached from the inside of the tire, and it is also possible to avoid erroneous estimation of the road surface condition.

Another aspect of the present invention relates to an apparatus for determining detachment of an acceleration sensor attached to inside of a tire for detecting an acceleration signal in a tire circumferential direction or in a tire width direction, from the inside of the tire, the apparatus including: an acceleration information acquisition means for acquiring, as acceleration information, one or both of a peak level and a peak interval of the acceleration signal; an average value calculation means for calculating an average value of the acquired acceleration information, a difference ratio calculation means for calculating a difference ratio which is a ratio of a difference between the acquired acceleration information and the calculated average value to the calculated average value; and a detachment determination means for determining whether or not the acceleration sensor is detached from the inside of the tire based on the difference ratio, in which the average value calculation means calculates an average value of at least three of acceleration information immediately before the acquired acceleration information, and the detachment determination means determines detachment of the acceleration sensor from the inside of the tire when the difference ratio exceeds a threshold value by multiple number of times successively.

By employing such a configuration, it is possible to obtain an apparatus for determining detachment of an acceleration sensor, which is capable of accurately determining whether or not the acceleration sensor is detached from the inside of the tire.

It should be noted that the above-described summary of the invention is not intended to enumerate all the features necessary for the present invention, a sub-combination of these feature groups may also be the invention.

DESCRIPTION OF EMBODIMENTS

Exemplary Embodiment

Figure 1:
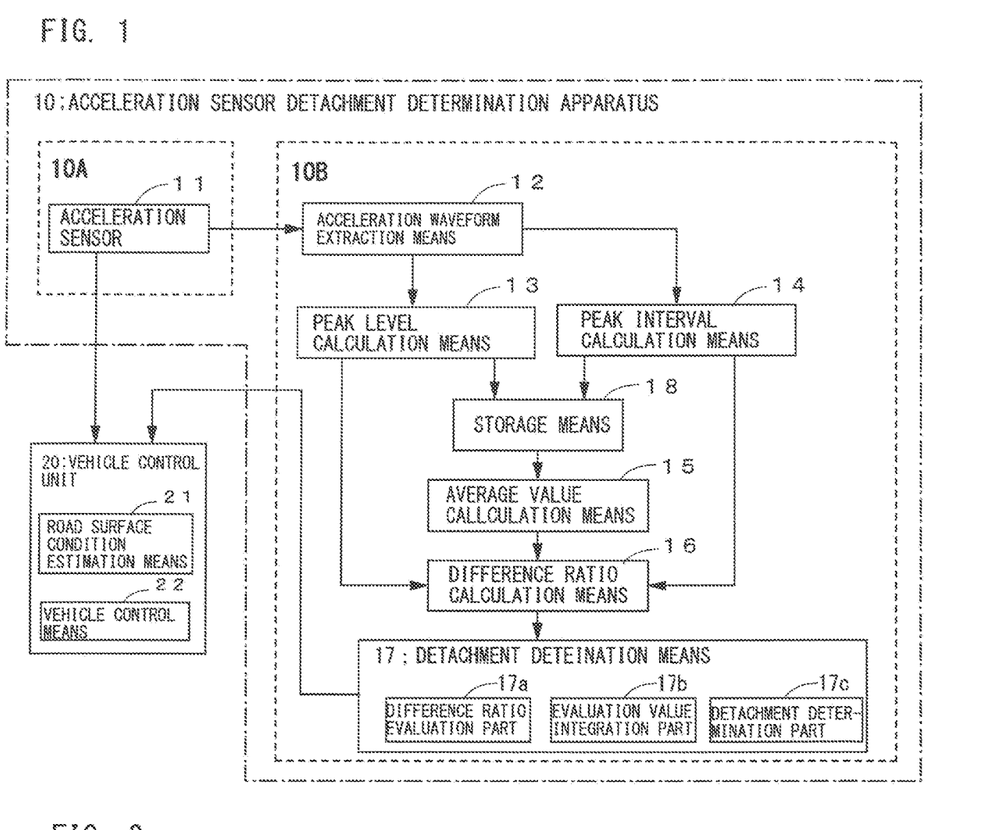
FIG. 1 is a block diagram illustrating a configuration of an apparatus for determining detachment of an acceleration sensor according to an aspect of the present invention.

FIG. 1 a block diagram illustrating a configuration of an apparatus 10 for determining detachment of an acceleration sensor according to an exemplary embodiment of the present invention. In FIG. 1, reference numeral 11 denotes an acceleration sensor, 12 denotes an acceleration waveform extraction means, 13 denotes a peak level calculation means, 14 denotes a peak interval calculation means, 15 denotes an average value calculation means, 16 denotes a difference ratio calculation means, 17 denotes a detachment determination means, and 18 denotes a storage means. The peak level calculation means 13 and the peak interval calculation means 14 constitutes the acceleration information acquisition means of the present invention.

The acceleration sensor 11 constitutes a sensor unit 10A, and each means from the acceleration waveform extraction means 12 to the detachment determination means 17 and the storage means 18 constitute a storage/computing unit 10B.

Each means constituting the storage/computing unit 10B is configured by software of a computer and a storage device such as a random access memory (RAM). A result of detachment determination by the apparatus 10 for determining detachment of the acceleration sensor is sent to a vehicle control unit 20 disposed on a vehicle body side (not-shown).

The vehicle control unit 20 includes a road surface condition estimation means 21 that estimates a road surface condition from an output signal of the acceleration sensor 11 and a vehicle control means 22, and controls running state of the vehicle based on the estimated road surface condition. Instead of the output signal of the acceleration sensor 11, data of acceleration waveforms extracted by the acceleration waveform extraction means 12 and data of peak levels calculated by the peak level calculation means 13 may be sent to the vehicle control unit 20.

Instead of the road surface condition estimation means, a means for estimating a tire condition such as a wear estimation means for estimating a wear condition of the tire may be provided to control the running state of the vehicle based on the estimated tire condition.

Figure 2:
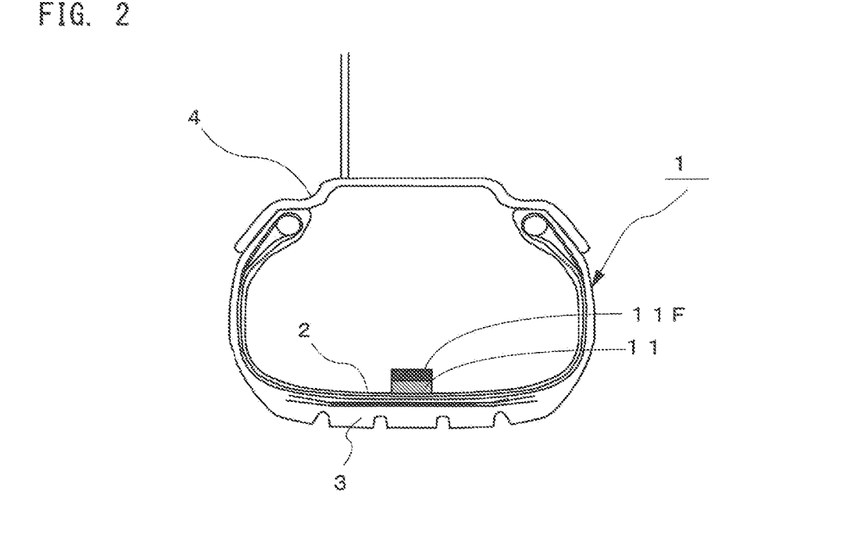
FIG. 2 is a diagram illustrating an example of how the acceleration sensor is attached.

The acceleration sensor 11 is disposed, as shown in FIG. 2, at a center of a tire width direction of an inner liner part 2 of a tire 1, so that a detection direction aligns with a tire radial direction, to thereby detect a tire radial direction acceleration input from the road surface and acting on a tire tread 3. As a configuration for transmitting output signals of the acceleration sensor 11 to the storage/computing unit 10B, for example, as illustrated in FIG. 2, it is desirable to configure such that a transmitter 11F be disposed on the inner liner part 2 or a wheel 4, the output signals of the acceleration sensor 11 be respectively amplified by amplifiers (not-shown), and thereafter transmitted wirelessly to the storage/computing unit 10B disposed on the vehicle body side.

Alternately, the configuration may be such that the storage/computing unit 10B be provided on the tire 1 side and data of the acceleration waveform, data of the peak level or data of the peak interval be transmitted to the vehicle controller 20 provided on the vehicle body side.

The acceleration waveform extraction means 12 extracts the tire radial direction acceleration waveform (hereinafter referred to as "acceleration waveform"), which is a time series waveform of the tire radial direction acceleration, output from the acceleration sensor 11 as illustrated in FIGS. 3A and 3B.

The length of the acceleration waveform to be extracted is a length including at least two peaks appearing at the step-in point $T_f$ (hereinafter referred to as "step-in side peak").

The peak level calculation means 13 calculates the peak level which is a magnitude of the step-in side peak and the peak interval calculation means 14 calculates the peak interval b which is a time interval between two step-in side peaks which are temporally adjacent to each other. The calculated peak level a and the calculated peak interval b are stored in the storage means 18 in the order of detection time of the step-in side peaks.

The average value calculation means 15 calculates, from the peak level a and the peak interval b that are stored in the storage means 18, an average value A of peak levels that are obtained by averaging peak levels a of past L times and an average value B of peak levels that are obtained by averaging peak levels b of past M times. Specifically, when assuming that the latest (at $t=t_k$) peak level is $a_k$, the peak interval is $b_k$, an average value $A_{k-1}$ of peak levels immediately before the peak level $a_k$ and an average value $B_{k-1}$ of peak intervals immediately before the peak interval $b_k$ are calculated by the following expressions (1) and (2).

$$A_{k-1}=(a_{k-3}+a_{k-2}+a_{k-1})/L \quad (1)$$

$$B_{k-1}=(b_{k-3}+b_{k-2}+b_{k-1})/M \quad (2)$$

It is sufficient that L and M are at least 3 and at most 10. L and M may be the same value or different values.

The difference ratio calculation means 16 calculates a peak level ratio $P_k$ which is a ratio of a difference between the latest peak level $a_k$ and the average value $A_{k-1}$ of the peak levels to the average value $A_{k-1}$ of the peak levels, and a peak interval ratio $Q_k$ which is a ratio of a difference between the latest peak interval $b_k$ and the average value $B_{k-1}$ of the peak intervals to the average value $B_{k-1}$ of the peak intervals. The peak level ratio $P_k$ and the peak interval ratio $Q_k$ are calculated by the following expressions (3) and (4).

$$P_k(\%)=(|a_k-A|/A)\times100 \quad (3)$$

$$Q_k(\%)=(|b_k-B|/B)\times100 \quad (4)$$

Hereinafter, the peak level ratio $P_k$ and the peak interval ratio $Q_k$ are called the difference ratio.

The detachment determination means 17 includes a difference ratio evaluation part 17a, an evaluation value integration part 17b and a detachment determination part 17c, and determines whether or not the acceleration sensor 11 is detached from the inside of the tire.

The difference ratio evaluation part 17a outputs an evaluation point z=1 in a case where the peak level $P_k$ is equal to or greater than a preset threshold value $K_p$ and the peak interval ratio $Q_k$ is equal to or greater than a preset threshold value $K_q$, and outputs the evaluation point z=0 in other cases.

The evaluation value integration part 17b calculates an integration value n obtained by sequentially integrating inputted evaluation values and outputs the calculated integration value n to the detachment determination part 17c. At this time, when the evaluation point z=0 is input, the evaluation value integration part 17b resets the integration value n to 0.

The detachment determination part 17c compares the inputted integration value n with a preset number of times N of determination, and determines that the acceleration sensor is detached from the inside of the tire when the integration value n reaches the number of times N of determination.

n=N is attained when the evaluation value z becomes 1 successively for N times. In other words, the detachment determination apparatus 10 of the present exemplary example determines that the acceleration sensor 11 is detached from the inside of the tire in a case where the peak level ratio $P_k \geq$ the threshold value $K_p$ and the peak interval ratio $Q_k \geq$ the threshold value $K_q$ continue successively for N times.

Figure 4:
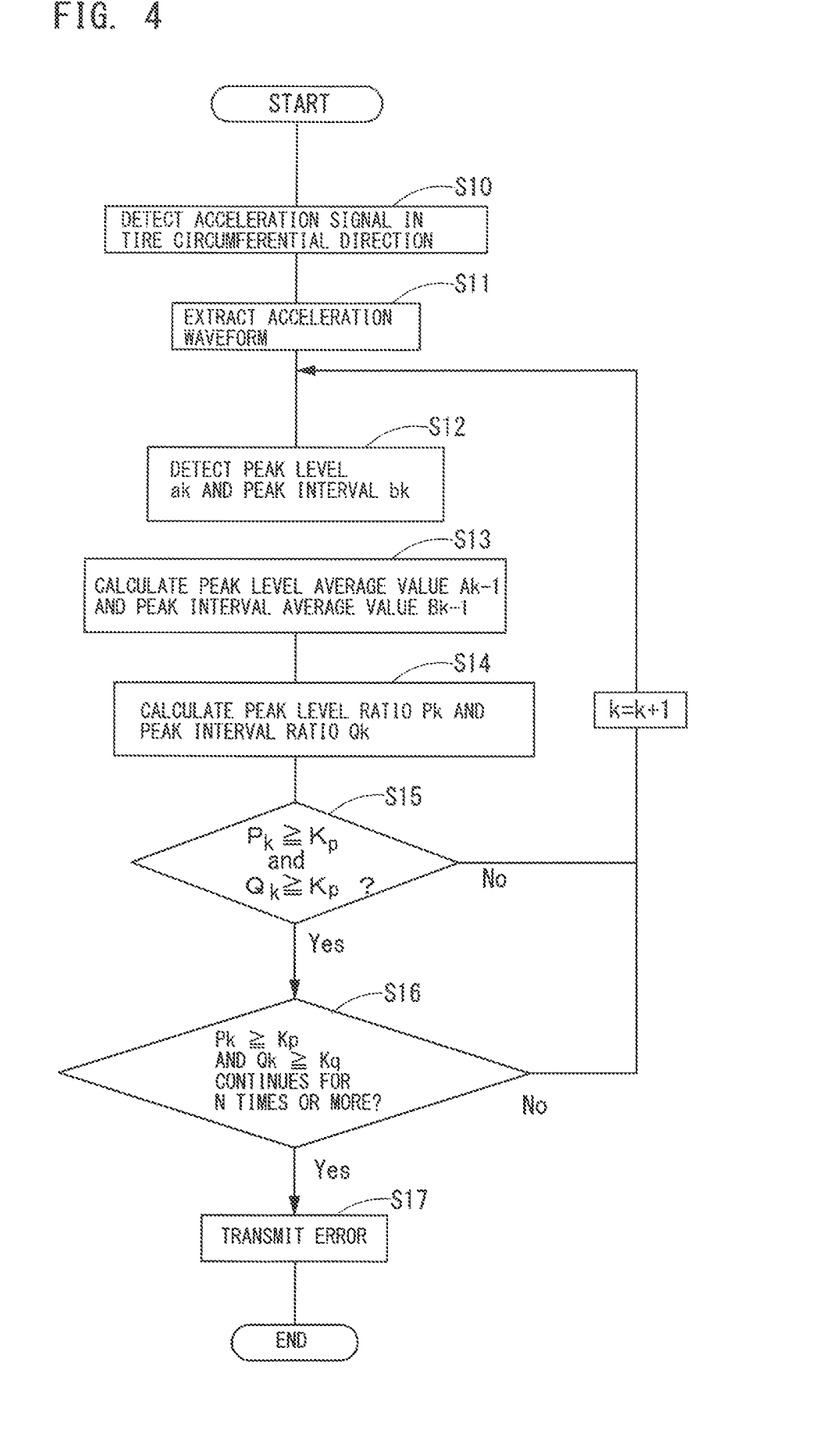
FIG. 4 is a flowchart illustrating a method for determining detachment of an acceleration sensor.

Next, a method for determining detachment of an acceleration sensor according to an exemplary example of the present invention will be explained with reference to a flowchart of FIG. 4.

First, a tire circumferential direction acceleration signal at the inside of the inner liner part 2, which deforms along with deformation of the tire tread 3, is detected and amplified, and thereafter, is transmitted from the transmitter 11 disposed in the inner liner part 2 to the storage/computation part 10B (step S10).

The storage/computing part 10B extracts the acceleration waveform from tire circumferential direction acceleration signals continuously output from the acceleration sensor 11 and acting on the tire tread 3 (step S11), detects the peak level $a_k$ which is the magnitude of peak (hereinafter referred to as "step-in side peak") appearing at the step-in point $T_f$ and the peak interval $b_k$ which is the time interval between two step-in side peaks temporally adjacent to each other and stores in the storage means 18 (step S12).

Next, the storage/computing part 10B calculates the peak level average value $A_{k-1}$ from the stored peak levels $a_{k-3}$ to $a_{k-1}$ and calculates the peak interval average value $B_{k-1}$ from the stored peak intervals $b_{k-3}$ to $b_{k-1}$ (step S13). Calculation of the average values $A_{k-1}$ and $B_{k-1}$ is performed with k≥4, and needless to say, up to k=3, after simply storing in the storage means 18, detection of the peak level $a_k$ and the peak interval $b_k$ is performed.

In the step S14, the peak level ratio $P_k$ is calculated from the peak level average value $A_{k-1}$ and the latest peak level $a_k$ and the peak interval ratio $Q_k$ is calculated from the peak interval average value $B_{k-1}$ and the latest peak interval $b_k$. The peak level average value $A_{k-1}$ and the peak interval average value $B_{k-1}$ are calculated by using the expressions (1) and (2) and the peak level ratio $P_k$ and the peak interval ratio $Q_k$ are calculated by using the expressions (3) and (4).

In the step S15, determination is made as to whether or not the peak level ratio $P_k$ is equal to or greater than the threshold value $K_p$ and the peak interval ratio $Q_k$ is equal to or greater than the threshold value $K_q$. In the present exemplary example, $K_p=K_q=3\%$.

If one or both of the peak level ratio $P_k$ and the peak interval ratio $Q_k$ is/are less than 3%, the process goes back to the step S12 and calculates a peak level $a_{k+1}$ and a peak interval $b_{k+1}$.

Alternately, in the step S15, if it is determined that both of the peak level ratio $P_k$ and the peak interval ratio $Q_k$ are equal to or greater than 3%, determination is made as to whether or not this state has continued successively for the number of times N of the determination (step S16). In the present exemplary example, the number of times is set to N=10.

In the step S16, in a case where the state in which both of the peak level ratio $P_k$ and the peak interval ratio $Q_k$ are equal to or greater than 3% has continued 10 times or more successively, the process proceeds to the step S17 and determination is made that the acceleration sensor 11 is detached from the inside of the tire, and the determination result is transmitted to the vehicle controller 20 (error transmission).

Alternately, in a case where the state in which both of the peak level ratio $P_k$ and the peak interval ratio $Q_k$ are equal to or greater than 3% has continued less than 10 times successively, the process goes back to the step S12 and the peak level $a_{k+1}$ and the peak interval $b_{k+1}$ are calculated.

In the foregoing, the invention has been described with reference to the specific exemplary embodiments thereof. However, the technical scope of this invention is not to be considered as limited to those embodiments. It will be evident to those skilled in the art that various modifications and changes may be made thereto. It will also be evident from the scope of the appended claims that all such modified and changed embodiments are intended to be included within the technical scope of this invention.

For example, in the exemplary example described above, determination is made as to whether or not the acceleration sensor 11 is detached by using the peak level a of the step-in side peak and the peak interval b, however, a peak appearing at the kick-out point $T_k$ may be used as the peak utilized for the detachment determination.

Further, in the exemplary example described above, it is determined that the acceleration sensor 11 is detached from the inside of the tire in the case where the state that the peak level ratio $P_k$ is equal to or greater than the threshold value $K_p$ and the peak interval ratio $Q_k$ is equal to or greater than the threshold value $K_q$ has continued N times or more successively. However, it may be determined that the acceleration sensor 11 is detached from the inside of the tire in the case where the state that the peak level ratio $P_k$ is equal to or greater than the threshold value $K_p$ has continued N times or more successively or in the case where the peak interval ratio $Q_k$ is equal to or greater than the threshold value $K_q$ has continued N times or more successively.

Further, in the exemplary example described above, it is set that $K_p=K_q=3\%$ and $N=10$ times, however, it is not limited to this setting, it may be set that $K_p=K_q=5\%$ and $N=8$ times.

Further, the determination time N may be changed depending on the magnitude of the calculated peak level ratio $P_k$ or the peak interval ratio $Q_k$.

For example, like a case where a state in which the peak level $P_k$ becomes equal to or greater than 10% continues seven times successively or a case where a state in which the peak level $P_k$ becomes equal to or greater than 20% continues six times successively, when a difference between the peak level $P_k$ and the preset threshold value $P_k$ (3% in the present exemplary example) is large, the detachment determination may be performed efficiently by reducing the number of times N of determination in accordance with the difference.

Further, in the exemplary embodiments described above, the acceleration waveform in the tire circumferential direction is used as the acceleration waveform, however, the acceleration waveform in the tire width direction may be used.

In a case where the acceleration sensor is an acceleration sensor that detects acceleration in the tire radial direction, a differential acceleration waveform in the tire radial direction obtained by differentiating the acceleration signal in the tire radial direction may be used. In this case, a means for calculating the differential acceleration waveform from the extracted radial direction acceleration may be provided between the acceleration waveform extraction means 12, and the peak level calculation means 13 and the peak interval calculation means 14

The exemplary examples have been explained so far, the invention may be summarized as follows. That is, the present invention relates to a method for determining whether or not an acceleration sensor is detached from inside of a tire based on acceleration information acquired from an acceleration sensor, the method including the steps of: acquiring, as the acceleration information, a peak level which is a magnitude of a peak on a positive side or a negative side of an acceleration signal in a tire circumferential direction or in a tire width direction or a peak interval which is a time interval between peaks, or a peak level or a peak interval of a differential acceleration signal obtained by differentiating an acceleration signal in a tire width direction; calculating a ratio of a difference between the acquired acceleration information and an average value of the acceleration information to the average value; and determining whether or not the acceleration sensor is detached from the inside of the tire based on the ratio, in which the average value of the acceleration information is an average value of at least three of acceleration information immediately before the acquired acceleration information, and in the step of determining whether or not the acceleration sensor is detached from the inside of the tire, the determination of detachment of the acceleration sensor from the inside of the tire is made when the ratio exceeds a preset threshold value by multiple times successively.

In this way, since unevenness of the peak level or the peak interval in the detected acceleration waveform can be grasped accurately, it is possible to determine accurately whether or not the acceleration sensor is detached from the inside of the tire and it is also possible to avoid erroneous estimation of the road surface condition.

Further, since the peak level and the peak interval are used as the acceleration information, and determination of detachment of the acceleration sensor from the inside of the tire is made when both of the peak level ratio, which is a ratio of a difference between the peak level and the average value of the peak levels to the average value of the peak levels, and a peak interval ratio, which is a ratio of a difference between the peak interval and an average value of the peak intervals to the average value of the peak intervals respectively exceed a preset threshold value by multiple times successively, the accuracy of determination whether or not the acceleration sensor is detached from the inside of the tire is further improved.

Further, since the threshold value is set to equal to or greater than 3% of the average value and the number of times that exceeds the threshold value is set to 2 to 10 times, detachment determination can be performed efficiently. In other words, if it is less than 3%, a measurement error may be treated as an error. If the number of times that exceeds the threshold value is set to one, misdetermination may occur and, if it exceeds 10 times, the determination accuracy may not be improved.

Further, since the number of times that successively exceeds the threshold value is changed in accordance with the magnitude of the ratio of the difference between the peak level and the average value of the peak levels to the average value of the peak levels, and in accordance with the magnitude of the ratio of the difference between the peak interval and the average value of the peak intervals to the average value of the peak intervals, determination of detachment of the acceleration sensor from the inside of the tire can be performed efficiently.

Further, the present invention relates to an apparatus for determining detachment of an acceleration sensor, which determines detachment of an acceleration sensor attached to inside of a tire for detecting an acceleration signal in a tire circumferential direction or in a tire width direction, from inside of a tire, the apparatus including: an acceleration information acquisition means for acquiring, as acceleration information, one or both of a peak level and a peak interval of the acceleration signal; an average value calculation means for calculating an average value of the acquired acceleration information, a difference ratio calculation means for calculating a difference ratio which is a ratio of a difference between the acquired acceleration information and the calculated average value to the calculated average value; and a detachment determination means for determining whether or not the acceleration sensor is detached from the inside of the tire based on the difference ratio, in which the average value calculation means calculates the average value of at least three of acceleration information immediately before the acquired acceleration information, and the detachment determination means determines that the acceleration sensor is detached from the inside of the tire when the difference ratio exceeds a threshold value by multiple times successively.

With this configuration, an apparatus for determining detachment of an acceleration sensor, capable of accurately determining whether or not the acceleration sensor is detached from the inside of the tire can be obtained.

Further, the apparatus may be configured to include: an acceleration sensor attached to inside of a tire for detecting an acceleration signal in a tire radial direction; a differential acceleration calculation means for differentiating the acceleration signal to calculate a differential acceleration in the tire radial direction; an acceleration information acquisition means for acquiring one or both of a peak level and a peak interval of the differential acceleration signal, which are acceleration information, to determine, by using the acquired acceleration information, that the acceleration sensor is detached from the inside of the tire.

DESCRIPTION OF REFERENCE NUMERALS

1: Tire, 2: Inner liner part, 3: Tire tread, 4: Wheel, 10: Apparatus for determining detachment of an acceleration sensor, 10A: Sensor part, 10B: Storage/computing unit, 11: Acceleration sensor, 11F: Transmitter, 12: Acceleration waveform extraction means, 13: Peak level calculation means, 14: Peak interval calculation means, 15: Average value calculation means, 16: Difference ratio calculation means; 17: Detachment determination means, 17a: Difference ratio evaluation part, 17b: Evaluation value integration part, 17c: Detachment determination part, 18: Storage means, 20: Vehicle control device, 21: Load surface condition estimation means, 22: Vehicle control means.

The invention claimed is:

1. A method for determining whether or not an acceleration sensor is detached from inside of a tire based on acceleration information acquired from the acceleration sensor, the method comprising the steps of:
acquiring, as the acceleration information, a peak level which is a magnitude of a peak on a positive side or a negative side of an acceleration signal in a tire circumferential direction or a in a tire width direction or a peak interval which is a time interval between peaks, or a peak level or a peak interval of a differential acceleration signal obtained by differentiating an acceleration signal in a tire width direction;
calculating a ratio of a difference between the acquired acceleration information and an average value of the acceleration information to the average value; and
determining whether or not the acceleration sensor is detached from the inside of the tire based on the ratio,
wherein the average value of the acceleration information is an average value of at least three of acceleration information immediately before the acquired acceleration information, and
in the step of determining whether or not the acceleration sensor is detached from the inside of the tire, the determination of detachment of the acceleration sensor from the inside of the tire is made when the ratio exceeds a preset threshold value by a plurality of number of times successively.

2. The method for determining detachment of an acceleration sensor acceleration according to claim 1,
wherein the acceleration information include the peak level and the peak interval, and
wherein the determination of detachment of the acceleration sensor from the inside of the tire is made when both of
a peak level ratio which is a ratio of a difference between the peak level and an average value of peak levels to the average value of the peak levels, and
a peak interval ratio which is a ratio of a difference between the peak interval and an average value of peak intervals to the average value of the peak intervals exceeds a preset threshold value by a plurality of number of times successively.

3. The method for determining detachment of an acceleration sensor according to claim 1,
wherein the threshold value is 3% to 65% of the average value, and the number of times that successively exceeds the threshold is two to ten times.

4. The method for determining detachment of an acceleration sensor according to claim 3,
wherein the number of times that successively exceeds the threshold vale is changed in accordance with a magnitude of the ratio of the difference between the peak level and the average value of the peak levels to the average value of the peak levels, and the ratio of the difference between the peak interval and the average value of the peak intervals to the average value of the peak intervals.

5. An apparatus for determining detachment of an acceleration sensor attached to inside of a tire for detecting an acceleration signal in a tire circumferential direction or in a tire width direction, from the inside of the tire, the apparatus comprising:
a memory and at least one processor configured to implement:
an acceleration information acquisition unit that acquires, as acceleration information, one or both of a peak level and a peak interval of the acceleration signal;
an average value calculation unit that calculates an average value of the acquired acceleration information,
a difference ratio calculation unit that calculates a difference ratio which is a ratio of a difference between the acquired acceleration information and the calculated average value to the calculated average value; and
a detachment determination unit that determines whether or not the acceleration sensor is detached from the inside of the tire based on the difference ratio,
wherein the average value calculation unit is configured to calculate the average value of at least three of acceleration information immediately before the acquired acceleration information, and
the detachment determination unit if configured to determined that the acceleration sensor is detached from the inside of the tire when the difference ratio exceeds a threshold value by a plurality of number of times successively.

6. An apparatus for determining detachment of an acceleration sensor attached to inside of a tire for detecting an acceleration signal in a tire radial direction, the apparatus comprising:
a memory and at least one processor configured to implement:
a differential acceleration calculation unit that differentiates the acceleration signal to calculate a differential acceleration in the tire radial direction;
an acceleration information acquisition unit that acquires, as acceleration information, one or both of a peak level and a peak interval of the differential acceleration signal;
an average value calculation unit that calculates an average value of the acquired acceleration information,
a difference ratio calculation unit that calculates a difference ratio which is a ratio of a difference between the acquired acceleration information and the calculated average value to the calculated average value; and
a detachment determination unit that determines whether or not the acceleration sensor is detached from the inside of the tire based on the difference ratio,
wherein the average value calculation unit is configured to calculate the average value of the acceleration information of at least three of acceleration information immediately before the acquired acceleration information, and
the detachment determination unit is configured to determine that the acceleration sensor is detached from the inside of the tire when the difference ratio exceeds a threshold value by a plurality of number of times successively.

\* \* \* \* \*